United States Patent Office 3,679,444
Patented July 25, 1972

3,679,444
CONTROL OF SHRINKAGE AND GROWTH OF SILICON OXYNITRIDE BODIES
Malcolm E. Washburn, Princeton, Mass., assignor to Norton Company, Worcester, Mass.
No Drawing. Filed June 29, 1970, Ser. No. 50,940
Int. Cl. C04b 35/58
U.S. Cl. 106—55    3 Claims

ABSTRACT OF THE DISCLOSURE

Control of the physical dimensions of silicon oxynitride articles, during firing of the shaped reaction mix, is achieved by inclusion of colloidal silica, such as fume silica, in the reaction mix, preferably in the amount of 5% by weight of the mix, exclusive of temporary binders. Use of fused silica, instead of flint, also helps control dimensional changes. Amounts of from 2% to 40% of colloidal silica are useful in control of shape or properties of fired product.

---

This invention relates to the production of silicon oxynitride refractory articles and control of the physical dimensions of such articles.

I have found that silicon oxynitride articles made by techniques described in U.S. Pat. 3,356,513 have a tendency to change dimensions upon firing by undergoing volume growth. This growth is variable and under certain conditions such as the type of silica used in the raw batch and by firing can result in changes as much as 8 to 10 percent by volume or 2 to 3 percent on a linear basis. Frequently, on large pieces, this change can cause cracking and warpage of the item. Although many ceramic applications can tolerate some change, I have found that certain applications where precision is a requirement, such as setter plates for electronic parts with glass to metal seals, a growth of 1% on a linear basis is too much to tolerate.

I have found that I can control the growth by careful control of the mixture and by adding certain amounts of a finely divided form of silica such as silica fume or submicron silica.

Silicon oxynitride refractory bodies are made by mixing silicon and silica together with a catalyst such as lime. forming the mixture with a suitable green binder such as polypropylene glycol into a shape by pressing, and firing in a nitrogen atmosphere. The preferred amounts of silicon and silica are in a molar ratio of 3 silicon to 1 silica. When flint is used as the source of silica in this ratio, 2 percent linear growth can be expected. By reducing the quantity of flint such that the molar ratio of Si to $SiO_2$ is 3.9 the linear growth drops to 1.7 percent as seen in Table I. This composition, however, produces a refractory body with a greater amount of $Si_3N_4$ which is considered to be an impurity, i.e.,

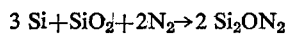
3 Si+$SiO_2$+2$N_2$→2 $Si_2ON_2$

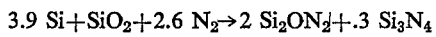
3.9 Si+$SiO_2$+2.6 $N_2$→2 $Si_2ON_2$+.3 $Si_3N_4$

It has been found that the silica converts to cristobalite just prior to the reaction to form oxynitride and the subsequent density change causes the growth. The density of flint is 2.6 g./cc. whereas the density of cristobalite is 2.3 g./cc. Upon conversion from one form to the other, the change in density results in a volume increase. By reducing the quantity of flint the amount of growth is reduced.

I have found that further reduction of growth can be achieved by substituting fused silica (i.e. non-crystalline, glassy silica) for the flint. In this case, as seen in Table I, the growth can be reduced to 1.3 percent and no difference can be seen between the 3.9 and 3.1 molar ratios.

TABLE I

| Molar ratio Si/$SiO_2$ | Type of silica | Percent linear growth [1] |
|---|---|---|
| 3.1 | Flint | 2.2 |
| 3.9 | do | 1.7 |
| 3.1 | Fused silica | 1.3 |

[1] Average of five, 8" x 2" x ¾" test bars, measured on the long dimension.

Fused silica has a density of 2.2 g./cc. and upon conversion to cristobalite prior nitridation very little change in volume takes place. The growth of 1.3 linear percent, however, is still too high to produce refractory items with close tolerances.

It has been observed that linear growth decreases if reaction times are longer at a lower temperature. In two different furnace runs with different conditions as shown in Table II, linear growth was found to be considerably lower for those runs with less severe firing conditions.

TABLE II

| | Max. temp., °C., during reaction | Reaction time, hours | Percent linear growth of typical 9" test bars |
|---|---|---|---|
| Run: | | | |
| A | 1,350 | 7 | 1.3 |
| B | 1,280 | 15 | .5 |
| C | (1) | 48 | .6 |

[1] Helium injection.

Run C was operated such that the nitrogen partial pressure was controlled by injection of helium to maintain the reaction rate at a level below 26% per hour, as taught in my copending application filed on or about June 30, 1970, entitled Process for Producing Silicon Oxynitride.

It has also been found that longer reaction times of 48 hours with the exothermic reaction controlled to a slow rate by helium injection into the nitrogen system does not produce any further decrease in linear growth.

This remaining amount of observed linear growth is believed to be due to the crystallization of silicon oxynitride itself and is still greater than desired for a precision ceramic material.

I have found that absolute control of growth can be achieved by adding finely divided submicron silica having a particle size of 0.5 micron or less in a specific quantity and that items exhibiting essentially no growth can be produced conveniently and economically.

The magnitude of observed linear growth is proportional to the amount of submicron silica that is added. This is shown by the measured values of Runs B and C shown in Table III.

TABLE III

Run B

| Percent silica fume: | Percent linear growth [1] |
|---|---|
| 0 | .45 |
| 0 | .42 |
| 0 | .50 |
| 0 | .46 |

See footnote at end of table.

TABLE III—Run B—Continued

| Percent silica fume: | Percent linear growth [1] |
|---|---|
| 5 | −.04 |
| 5 | .05 |
| 5 | −.11 |
| 5 | .02 |
| 10 | −.05 |
| 10 | −.22 |
| 20 | −.67 |
| 20 | −.56 |
| 20 | −.45 |
| 30 | −1.47 |
| 30 | −1.54 |
| 30 | −1.59 |
| 30 | −1.50 |
| 40 | −2.88 |
| 40 | −3.14 |
| Run C | |
| 0 | .55 |
| 0 | .70 |
| 0 | .74 |
| 2 | .34 |
| 2 | .34 |
| 2 | .55 |
| 4 | .14 |
| 4 | .27 |
| 4 | .11 |
| 6 | .33 |
| 6 | .20 |
| 6 | −.01 |
| 8 | .09 |
| 8 | −.29 |
| 8 | −.27 |

[1] Measured on 8 x 2 x ¾″ test bars.

When these data are analyzed by computer the following linear equations are obtained:

Run B:

Percent $\Delta L = .628 - 0.0938$ (Percent S.F.)

Run C:

Percent $\Delta L = .488 - 0.0731$ (Percent S.F.)

When these equations are solved for the no growth condition or percent $\Delta L = 0$, the following percent silica fume additions are obtained:

Run B: Percent S.F. = 6.70%
Run C: Percent S.F. = 6.68%

The observed growth in silicon oxynitride compacts is believed to be associated with the formation of the oxynitride crystal and it is believed that control of growth by addition of submicron silica is caused by changing the crystal growth habit.

Silicon oxynitride crystals are believed to form from a solid state reaction between Si and $SiO_2$ as follows, i.e., $$6Si + 2SiO_2 \rightleftarrows 4Si_2O$$

This intermediate then cross links with nitrogen to form a unit cell of $Si_2ON_2$ with orthorhombic symmetry, i.e., $$4Si_2O + 4N_2 \rightarrow 4Si_2ON_2$$

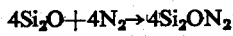

In order for these reactions to proceed the silicon and silica particles must be in close physical contact with each other. This results in the formation of crystals in the proximity of the starting particles. If these particles are relatively large then crystals can grow into each other and displace adjacent crystals resulting in growth. By adding finely divided submicron silica greater mobility is achieved in the starting materials and crystal growth can take place in the pores of the initial compact.

By allowing crystals to grow into the pores in the irregular manner, I believe that resulting refractory compacts are not only dimensionally stable but pore size is reduced and intergranular locking takes place, causing higher strength. This improvement in strength and density can be seen in Table IV.

TABLE IV.—STRENGTH AND DENSITY OF 8-INCH TEST BARS OF RUN C

| Percent silica fume | Modulus of rupture,[1] p.s.i. | Density, g./cc. |
|---|---|---|
| 0 | 5,300 | 2.04 |
| 2 | 5,800 | 2.10 |
| 4 | 7,200 | 2.08 |
| 6 | 9,700 | 2.14 |
| 8 | 11,600 | 2.19 |

[1] Fired test bars were 8 x 2 x ¾″; isostatically pressed in green state at 40,000 p.s.i., broken in test 7″ span with 3 point loading.

EXAMPLE I

A mixture of technical grade silicon of −200 mesh size, fused silica of 99% purity of −200 mesh size, silica fume of 98% purity, and powdered lime, was blended dry in a relative weight proportion of 59:35:5:1. This mixture was then mixed with 12 parts by weight of polypropylene glycol dissolved in enough methylene chloride to make the total mixture fluid with the consistency of a creamy slip. The combination was mixed until most of the solvent had evaporated off leaving a powdered mixture. This powder was then spread on paper and allowed to dry completely. A test bar measuring 9 x 2¼ x ⅞″ was then pressed from the mixture in a steel mold. This bar was then sealed in a plastic bag and pressed in an isostatic press at 20,000 p.s.i. The dimensions of the green bar were 8.648 x 2.149 x .717 inches. The bar was fired in a nitrogen atmosphere for 36 hours at temperatures ranging from 1200° C. to 1330° C. After firing the bar dimensions were 8.652 x 2.158 x .721 inches indicating that a change of +1.03% by volume or +0.05% in length had taken place.

EXAMPLE II

A mixture was made as in Example I but −250 mesh silicon was used in the following weight proportions: silicon, 59: fused silica, 34: silica fume, 6: CaO, 1. This pressed into a test bar as in Example I with isostatic pressure of 40,000 p.s.i. The bar had green dimensions of 8.544 x 2.136 x .720 inches. After firing in a nitrogen atmosphere for 45 hours at temperatures ranging from 1250° C. to 1395° C. the bar had dimensions of 8.537 x 2.141 x .721 inches indicating that a change of +.29% by volume or −0.08% in length had taken place. The test bar showed a weight increase of 32.8% upon firing which can be calculated as 83.1% of theoretical to form $Si_2ON_2$. Modulus of rupture of the bar was 7830 p.s.i. measured at room temperature.

Since the growth characteristics of a particular mix are determined in part by the raw materials used and their proportions, and by the firing conditions; and since some growth may be desirable because of the tendency of shrinkage to cause warping of plates, and because it may be desirable to leave room for bringing a piece to exact tolerance by machining or sanding, it is desirable in some cases to permit some controlled growth. Thus a preferred amount of silica fume is 5% (based on the weight of the green mix, excluding binders and water) and as low as 2% is useful. On the other hand, where high density (low porosity) products are desired and the dimensional stability is not critical all of the silica in the mix may be present as fume silica. Thus the range of the present invention includes, for control of shrinkage, or growth, the use of from 2% to 15% of fume silica. In general the preferred, most useful, range is from 2 to 15%.

What is claimed is:

1. A raw batch for producing fired shaped bodies of silicon oxynitride by the reaction $3Si + SiO_2 + 2N_2 \rightarrow 2Si_2ON_2$ consisting of silica, silicon, a catalyst and a temporary binder, pressed to shape, characterized in that from 2 to 15% by weight of the mix, apart from the temporary binder consists of particles of silica not larger than 0.5 micron, the remainder of said silica being selected from the group consisting of flint and fused silica and mixtures thereof.

2. A raw batch as in claim 1 in which the silica having particles not larger than 0.5 micron consists of fume silica.

3. In the production of shaped bodies of silicon oxynitride in the presence of a catalyst by the reaction $3Si + SiO_2 + 2N_2 \rightarrow 2Si_2ON_2$ from a pre-shaped reaction mix of silica and silicon, the improvement consisting of including, as a portion of the $SiO_2$ in the mix, a colloidal silica powder having particles 0.5 micron and smaller in the amount of from 2 to 15% by weight of the reaction mix apart from temporary binder, the remainder of the silica being selected from the group consisting of flint and fused silica and mixtures thereof, whereby control of shrinkage or growth is achieved.

References Cited

UNITED STATES PATENTS 3,356,513    12/1967    Washburn _____ 106—55

JAMES E. POER, Primary Examiner

U.S. Cl. X.R.

106—69